United States Patent
Sinclair (10) Patent No.: US 8,452,940 B2
(45) Date of Patent: May 28, 2013

(54) OPTIMIZED MEMORY MANAGEMENT FOR RANDOM AND SEQUENTIAL DATA WRITING

(75) Inventor: Alan W. Sinclair, Falkirk (GB)

(73) Assignee: SanDisk Technologies Inc., Plano, TX (US)

( * ) Notice: Subject to any disclaimer, the term of this patent is extended or adjusted under 35 U.S.C. 154(b) by 505 days.

(21) Appl. No.: 12/346,451

(22) Filed: Dec. 30, 2008

(65) Prior Publication Data

US 2010/0169588 A1 Jul. 1, 2010

(51) Int. Cl.
*G06F 12/00* (2006.01)

(52) U.S. Cl.
USPC ........... 711/172; 711/103; 711/202; 711/209; 711/E12.005; 711/E12.013

(58) Field of Classification Search
USPC .................. 711/170, 172, 202, 209, E12.005, 711/E12.013, 103
See application file for complete search history.

(56) References Cited

U.S. PATENT DOCUMENTS

| | | | |
|---|---|---|---|
| 6,480,936 B1 | 11/2002 | Ban et al. | |
| 6,678,785 B2 | 1/2004 | Lasser | |
| 6,725,328 B2 * | 4/2004 | Kano et al. | 711/112 |
| 7,110,373 B2 * | 9/2006 | Lee | 711/170 |
| 7,139,864 B2 | 11/2006 | Bennett et al. | |
| 2002/0099904 A1 | 7/2002 | Conley | |
| 2002/0129192 A1 * | 9/2002 | Spiegel et al. | 711/103 |
| 2003/0164745 A1 | 9/2003 | Takamine | |
| 2004/0044837 A1 | 3/2004 | Hasbun et al. | |
| 2005/0273551 A1 | 12/2005 | Keays | |
| 2006/0020744 A1 | 1/2006 | Sinclair et al. | |
| 2006/0155920 A1 | 7/2006 | Smith et al. | |
| 2006/0155922 A1 | 7/2006 | Gorobets et al. | |
| 2006/0161722 A1 | 7/2006 | Bennett et al. | |
| 2006/0184723 A1 | 8/2006 | Sinclair et al. | |
| 2006/0224819 A1 | 10/2006 | Ito | |
| 2007/0033324 A1 | 2/2007 | Sinclair | |
| 2007/0033325 A1 | 2/2007 | Sinclair | |
| 2007/0033364 A1 | 2/2007 | Maeda et al. | |
| 2007/0143560 A1 | 6/2007 | Gorobets | |
| 2007/0143561 A1 | 6/2007 | Gorobets | |
| 2007/0156998 A1 | 7/2007 | Gorobets | |
| 2007/0174582 A1 * | 7/2007 | Feldman | 711/202 |

(Continued)

OTHER PUBLICATIONS

Office Action issued in U.S. Appl. No. 12/346,433, dated Mar. 19, 2011 (8 pages).

(Continued)

*Primary Examiner* — Pierre-Michel Bataille
(74) *Attorney, Agent, or Firm* — Brinks Hofer Gilson & Lione (57) ABSTRACT

A method and system writes data to a memory device including writing data to varying types of physical write blocks. The method includes receiving a request to write data for a logical block address within an LBA range to the memory device. Depending on whether the quantity of valid data in the memory device meets a predetermined criteria, the data is written to a specific chaotic block, a general chaotic block, or a mapped block. The mapped block is assigned for writing data for the LBA range, the specific chaotic block is assigned for writing data for contiguous LBA ranges including the LBA range, and the general chaotic block is assigned for writing data for any LBA range. Lower fragmentation and write amplification ratios may result by using this method and system.

22 Claims, 9 Drawing Sheets

U.S. PATENT DOCUMENTS

| | | |
|---|---|---|
| 2008/0307158 A1 | 12/2008 | Sinclair |
| 2008/0307192 A1 | 12/2008 | Sinclair et al. |
| 2009/0055620 A1* | 2/2009 | Feldman et al. ............. 711/202 |
| 2009/0164745 A1 | 6/2009 | Sinclair et al. |
| 2010/0169542 A1 | 7/2010 | Sinclair |

OTHER PUBLICATIONS

Office Action issued in U.S. Appl. No. 11/963,413, dated Jul. 25, 2011 (16 pages).

Office Action issued in U.S. Appl. No. 11/963,413, dated Jan. 14, 2011 (15 pages).

Notice of Allowance and Fee(s) Due issued in U.S. Appl. No. 12/346,433, filed Dec. 30, 2008, date mailed Mar. 9, 2012, 3 pgs.

Final Office Action issued in U.S. Appl. No. 12/346,433, filed Dec. 30, 2008, date mailed Nov. 4, 2011;8 pgs.

Final Office Action, issued in U.S. Appl. No. 11/963,413, filed Dec. 21, 2007, date mailed Jul. 25, 2011, 15 pgs.

* cited by examiner

OPTIMIZED MEMORY MANAGEMENT FOR RANDOM AND SEQUENTIAL DATA WRITING

TECHNICAL FIELD

This application relates generally to memory devices. More specifically, this application relates to mapping logical addresses to physical addresses in reprogrammable non-volatile semiconductor flash memory.

BACKGROUND

Non-volatile memory systems, such as flash memory, have been widely adopted for use in consumer products. Flash memory may be found in different forms, for example in the form of a portable memory card that can be carried between host devices or as a solid state disk (SSD) embedded in a host device. When writing data to a conventional flash memory system, a host typically writes data to, and reads data from, addresses within a logical address space of the memory system. The memory system then commonly maps data between the logical address space and the physical blocks or metablocks of the memory, where data is stored in fixed logical groups corresponding to ranges in the logical address space. Generally, each fixed logical group is stored in a separate physical block of the memory system. The memory system keeps track of how the logical address space is mapped into the physical memory but the host is unaware of this. The host keeps track of the addresses of its data files within the logical address space but the memory system generally operates without knowledge of this mapping.

A drawback of memory systems that operate in a logical address space, also referred to as logical block address (LBA) format, is fragmentation. Data written by a host file system may often be fragmented in logical address space, where many fixed logical groups are only partially updated with new data. The fragmentation may occur as a result of cumulative fragmentation of free space by the host file system, and possibly even as a result of inherent fragmentation of individual files by the host file system. Data previously written may become obsolete due to deletion and cause further fragmentation. The fragmented logical groups will need to be rewritten in full in a different physical block. The process of rewriting the fragmented logical groups may involve copying unrelated data from the prior location of the logical group.

Fragmentation may also increase if data is written randomly followed by data written sequentially in the logical address space. The increased fragmentation may result in a higher than desired write amplification ratio, i.e., the ratio of the amount of data programmed, including internal copying/movement of data, relative to the amount of data written by a host. The overhead due to the increased fragmentation and write amplification ratio can result in lower performance and reduced device lifetime for the memory system.

SUMMARY

In order to address the problems noted above, a method and system for writing data to types of physical write blocks is disclosed.

According to a first aspect of the invention, a method is disclosed for writing data to a memory device including a plurality of memory blocks. The method includes receiving a request to write data to the memory device, where the data has a logical block address (LBA) within a first LBA range. The method also includes determining whether a quantity of valid data in the memory device meets a predetermined criteria. If the quantity of valid data does not meet the predetermined criteria, the data is written to a chaotic block. If the quantity of valid data meets the predetermined criteria, the data is written to a mapped block. A mapped block is assigned for writing data for the first LBA range. The predetermined criteria may include a predetermined threshold that is based on a length of the data. Determining whether the quantity of valid data meets the predetermined criteria may include determining whether the quantity of valid data exceeds the predetermined threshold.

Chaotic blocks may include a specific chaotic block and a general chaotic block. A specific chaotic block is assigned for writing data for a chaotic LBA range including the first LBA range, where the chaotic LBA range comprises a plurality of contiguous LBA ranges. Data is written to the specific chaotic block if the specific chaotic block exists in the memory blocks. A general chaotic block is assigned for writing data for any LBA range. Data is written to the general chaotic block if the specific chaotic block does not exist in the memory blocks. Writing data to the mapped block may include opening the mapped block prior to writing data to the mapped block if a quantity of mapped blocks does not meet a predetermined maximum and if the specific chaotic block does not exist. Alternatively, data may be written to the mapped block if the mapped block exists in the memory blocks and if the specific chaotic block does not exist in the memory blocks. The data written to a specific chaotic block may include host metadata.

If the quantity of mapped block is at a predetermined maximum, writing data to the mapped block may include closing a least recently written mapped block, opening the mapped block, and writing to the mapped block. Closing the least recently written mapped block includes relocating data for the first LBA range to the least recently written mapped block until the least recently written mapped block is full. Data may also be relocated for the first LBA range from a general chaotic block to the least recently written mapped block. In some embodiments, writing data to the mapped block includes relocating data for a second LBA range to the least recently written mapped block until the least recently written mapped block is full.

According to another aspect, a memory device includes a plurality of memory blocks and a controller. The controller is configured to receive a request to write data to the memory device, where the data has a logical block address (LBA) within a first LBA range. The controller is also configured to determine whether a quantity of valid data in the memory device meets a predetermined criteria. If the quantity of valid data does not meet the predetermined criteria, the data is written to a chaotic block. If the quantity of valid data meets the predetermined criteria, the data is written to a mapped block. A mapped block is assigned for writing data for the first LBA range. The predetermined criteria may include a predetermined threshold that is based on a length of the data. Determining whether the quantity of valid data meets the predetermined criteria may include determining whether the quantity of valid data exceeds the predetermined threshold.

Chaotic blocks may include a specific chaotic block and a general chaotic block. A specific chaotic block is assigned for writing data for a chaotic LBA range including the first LBA range, where the chaotic LBA range comprises a plurality of contiguous LBA ranges. Data is written to the specific chaotic block if the specific chaotic block exists in the memory blocks. A general chaotic block is assigned for writing data for any LBA range. Data is written to the general chaotic block if the specific chaotic block does not exist in the memory blocks. Writing data to the mapped block may include opening the mapped block prior to writing data to the mapped block if a quantity of mapped blocks does not meet a predetermined maximum and if the specific chaotic block does not exist. Alternatively, data may be written to the mapped block if the mapped block exists in the memory blocks and if the specific chaotic block does not exist in the memory blocks. The data written to a specific chaotic block may include host metadata.

If the quantity of mapped block is at a predetermined maximum, writing data to the mapped block may include closing a least recently written mapped block, opening the mapped block, and writing to the mapped block. Closing the least recently written mapped block includes relocating data for the first LBA range to the least recently written mapped block until the least recently written mapped block is full. Data may also be relocated for the first LBA range from a general chaotic block to the least recently written mapped block. In some embodiments, writing data to the mapped block includes the controller being configured to relocate data for a second LBA range to the least recently written mapped block until the least recently written mapped block is full.

BRIEF DESCRIPTION OF THE PRESENTLY PREFERRED EMBODIMENTS

Figure 1:
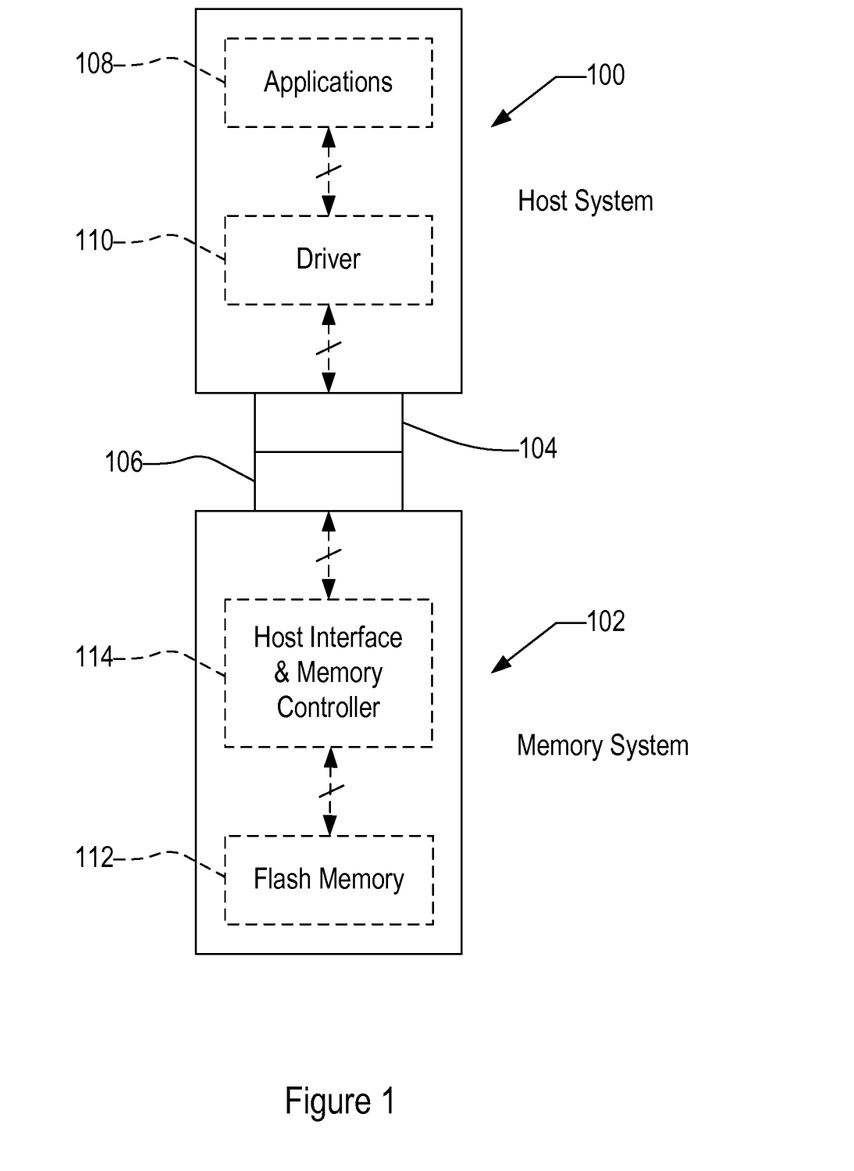
FIG. 1 is a block diagram of a host connected with a memory system having non-volatile memory.
Figure 2:
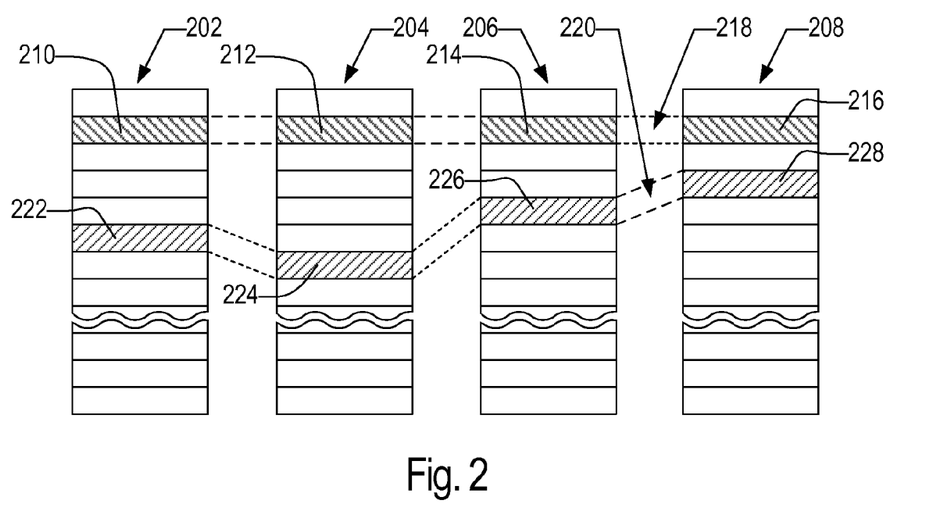
FIG. 2 illustrates an example physical memory organization of the system of FIG. 1.
Figure 3:
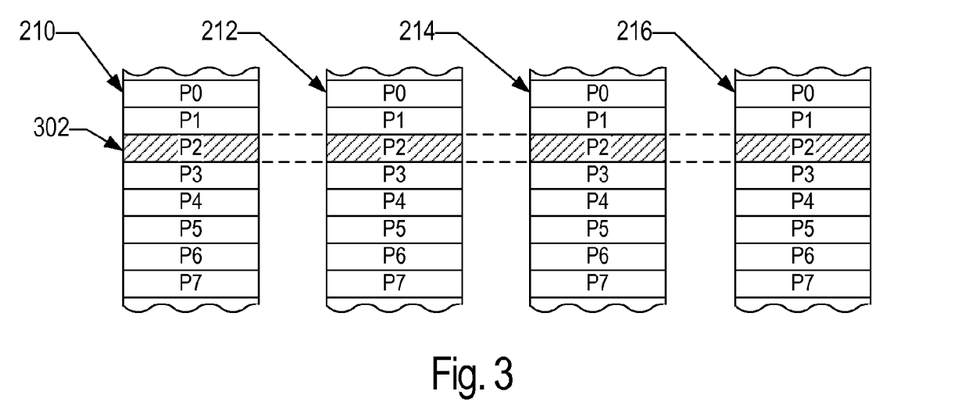
FIG. 3 shows an expanded view of a portion of the physical memory of FIG. 2.

A flash memory system suitable for use in implementing aspects of the invention is shown in FIGS. 1-3. A host system 100 of FIG. 1 stores data into and retrieves data from a flash memory 102. The flash memory may be embedded within the host, such as in the form of a solid state disk (SSD) drive installed in a personal computer. Alternatively, the memory 102 may be in the form of a card that is removably connected to the host through mating parts 104 and 106 of a mechanical and electrical connector as illustrated in FIG. 1. A flash memory configured for use as an internal or embedded SSD drive may look similar to the schematic of FIG. 1, with the primary difference being the location of the memory system 102 internal to the host. SSD drives may be in the form of discrete modules that are drop-in replacements for rotating magnetic disk drives.

One example of a commercially available SSD drive is a 32 gigabyte SSD produced by SanDisk Corporation. Examples of commercially available removable flash memory cards include the CompactFlash (CF), the MultiMediaCard (MMC), Secure Digital (SD), miniSD, Memory Stick, SmartMedia, TransFlash, and microSD cards. Although each of these cards has a unique mechanical and/or electrical interface according to its standardized specifications, the flash memory system included in each is similar. These cards are all available from SanDisk Corporation, assignee of the present application. SanDisk also provides a line of flash drives under its Cruzer trademark, which are hand held memory systems in small packages that have a Universal Serial Bus (USB) plug for connecting with a host by plugging into the host's USB receptacle. Each of these memory cards and flash drives includes controllers that interface with the host and control operation of the flash memory within them.

Host systems that may use SSDs, memory cards and flash drives are many and varied. They include personal computers (PCs), such as desktop or laptop and other portable computers, cellular telephones, personal digital assistants (PDAs), digital still cameras, digital movie cameras and portable audio players. For portable memory card applications, a host may include a built-in receptacle for one or more types of memory cards or flash drives, or a host may require adapters into which a memory card is plugged. The memory system usually contains its own memory controller and drivers but there are also some memory-only systems that are instead controlled by software executed by the host to which the memory is connected. In some memory systems containing the controller, especially those embedded within a host, the memory, controller and drivers are often formed on a single integrated circuit chip.

The host system 100 of FIG. 1 may be viewed as having two major parts, insofar as the memory 102 is concerned, made up of a combination of circuitry and software. They are an applications portion 108 and a driver portion 110 that interfaces with the memory 102. In a PC, for example, the applications portion 108 can include a processor running word processing, graphics, control or other popular application software. In a camera, cellular telephone or other host system that is primarily dedicated to performing a single set of functions, the applications portion 108 includes the software that operates the camera to take and store pictures, the cellular telephone to make and receive calls, and the like.

The memory system 102 of FIG. 1 includes flash memory 112, and circuits 114 that both interface with the host to which the card is connected for passing data back and forth and control the memory 112. The controller 114 typically converts between logical addresses of data used by the host 100 and physical addresses of the memory 112 during data programming and reading.

FIG. 2 conceptually illustrates an organization of the flash memory cell array 112 (FIG. 1) that is used as an example in further descriptions below. The flash memory cell array 112 may include multiple memory cell arrays which are each separately controlled by a single or multiple memory controllers 114. Four planes or sub-arrays 202, 204, 206, and 208 of memory cells may be on a single integrated memory cell chip, on two chips (two of the planes on each chip) or on four separate chips. The specific arrangement is not important to the discussion below. Of course, other numbers of planes, such as 1, 2, 8, 16 or more may exist in a system. The planes are individually divided into groups of memory cells that form the minimum unit of erase, hereinafter referred to as erase blocks. Erase blocks of memory cells are shown in FIG. 2 by rectangles, such as erase blocks 210, 212, 214, and 216, located in respective planes 202, 204, 206, and 208. There can be dozens or hundreds of erase blocks in each plane.

As mentioned above, the erase block of memory cells is the unit of erase, the smallest number of memory cells that are physically erasable together. For increased parallelism, however, the erase blocks are operated in larger metablock units. One erase block from each plane is logically linked together to form a metablock. The four erase blocks 210, 212, 214, and 216 are shown to form one metablock 218. All of the cells within a metablock are typically erased together. The erase blocks used to form a metablock need not be restricted to the same relative locations within their respective planes, as is shown in a second metablock 220 made up of erase blocks 222, 224, 226, and 228. Although it is usually preferable to extend the metablocks across all of the planes, for high system performance, the memory system can be operated with the ability to dynamically form metablocks of any or all of one, two or three erase blocks in different planes. This allows the size of the metablock to be more closely matched with the amount of data available for storage in one programming operation.

The individual erase blocks are in turn divided for operational purposes into pages of memory cells, as illustrated in FIG. 3. The memory cells of each of the blocks 210, 212, 214, and 216, for example, are each divided into eight pages P0-P7. Alternatively, there may be 16, 32 or more pages of memory cells within each block. The page is the unit of data programming and reading within an erase block, containing the minimum amount of data that are programmed or read at one time. However, in order to increase the memory system operational parallelism, such pages within two or more erase blocks may be logically linked into metapages. A metapage 302 is illustrated in FIG. 3, being formed of one physical page from each of the four erase blocks 210, 212, 214, and 216. The metapage 302, for example, includes the page P2 in each of the four blocks but the pages of a metapage need not necessarily have the same relative position within each of the blocks. A metapage is the maximum unit of programming.

Figure 4:
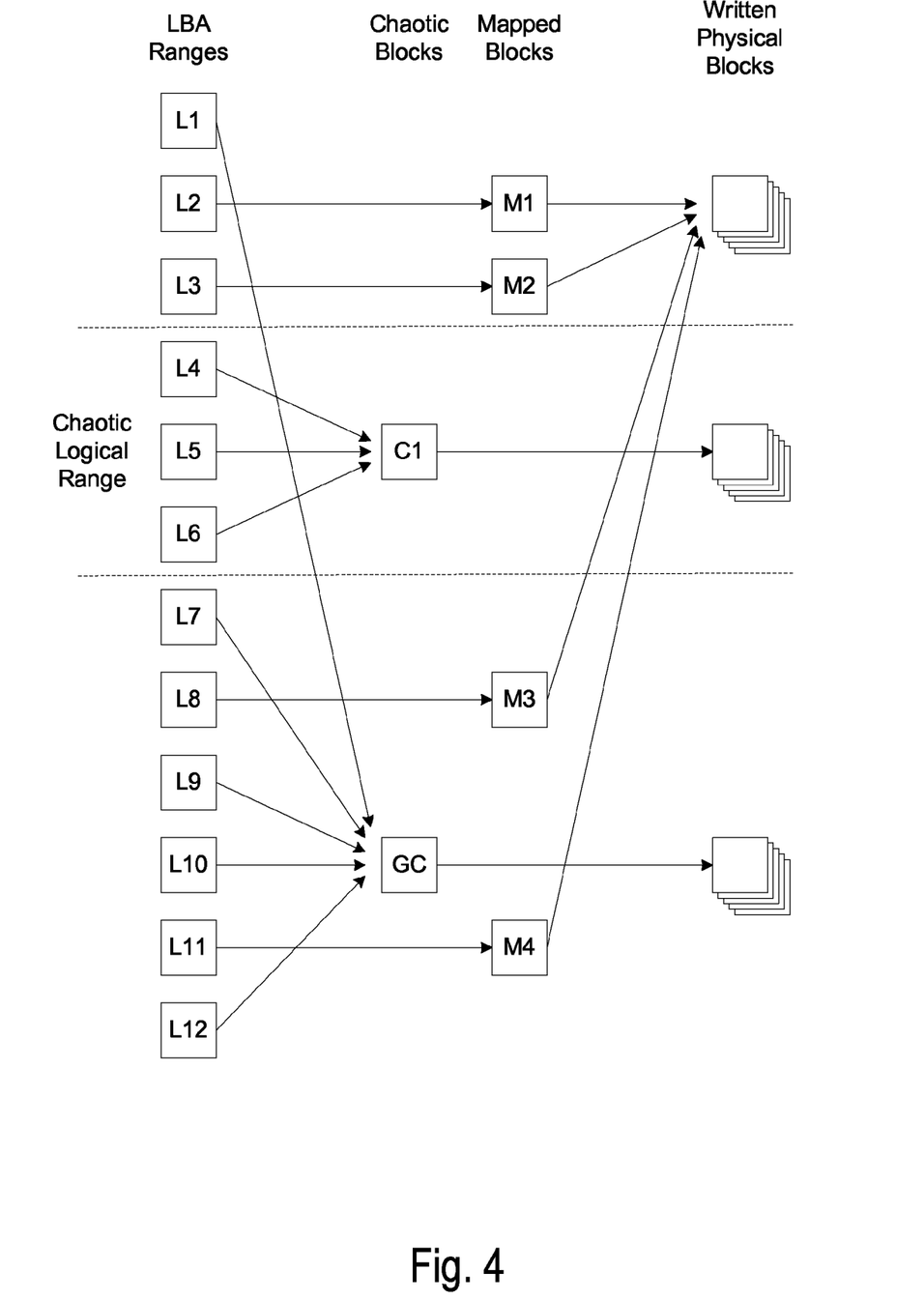
FIG. 4 illustrates exemplary assignments of logical block address ranges to physical write blocks.

FIG. 4 illustrates exemplary assignments of logical block address (LBA) ranges to types of physical write blocks according to an embodiment. An exemplary data management scheme that may be used with the memory system 102, also referred to as storage address remapping, operates to take LBAs associated with data sent by the host and remaps them to a second logical address space or directly to physical address space in an order the data is received from the host. Storage address remapping is described in U.S. patent application Ser. No. 12/036,014, filed Feb. 22, 2008, entitled "Method and System for Storage Address Re-Mapping for a Memory Device", which is hereby incorporated herein by reference. Each LBA corresponds to a sector, which is the minimum unit of logical address space addressable by a host. A host will typically assign data in clusters that are made up of one or more sectors. Also, in the following discussion, the term block is a flexible representation of storage space and may indicate an individual erase block or, as noted above, a logically interconnected set of erase blocks defined as a metablock. If the term block is used to indicate a metablock, then a corresponding logical block of LBAs should consist of a block of addresses of sufficient size to address the complete physical metablock.

Data to be written from the host system 100 to the memory system 102 may be addressed by clusters of one or more sectors managed in blocks. A write operation may be handled by writing data into a write block, and completely filling the write block with data in the order data is received, irrespective of the LBA of the data. A write block is created when the data is written to an unwritten block. A write block is always partially written because once a write block is full, it ceases being a write block. A write block may be filled in a single write operation or incrementally in a series of write operations. By writing data to the write block in the order it is received regardless of the LBA of the data, data is written in completed blocks by creating blocks with only unwritten capacity by means of flushing operations on partially obsolete blocks containing obsolete and valid data. A flushing operation may include relocating valid data from a partially obsolete block to another block, for example.

In an embodiment of the memory system 102, a write block may be of different types, including blocks that have been partially written with data and are assigned to a particular LBA range, known as mapped blocks; blocks that have been partially written with data for a specific plurality of contiguous LBA ranges, known as specific chaotic blocks; and blocks that have been partially written with data from any LBA range, known as general chaotic blocks. Mapped blocks, specific chaotic blocks, and general chaotic blocks may include obsolete data that results from previously written data being updated or deleted.

To minimize LBA fragmentation and the write amplification ratio, the memory system 102 writes data to a particular write block type depending on the LBA range of the data and the existence of mapped blocks, specific chaotic blocks, and whether a quantity of valid data in the memory system exceeds a predetermined threshold. Data written to a particular write block type is written in the order received while minimizing the number of write blocks. Data written from a host and data relocated during a flushing operation are treated identically when writing data to a particular write block type. A desirable low write amplification ratio for a given run of LBA addresses may result when sequentially addressed data is subsequently written to a particular write block following writing of randomly addressed data for the same run of LBA addresses.

Figure 6:
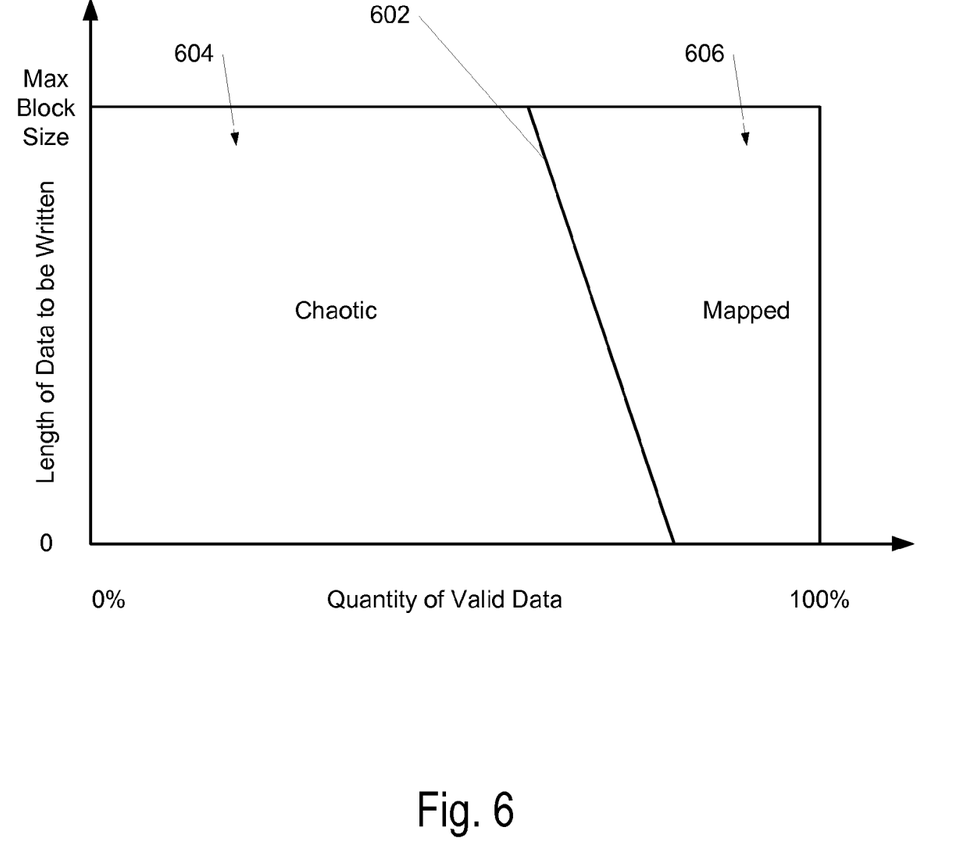
FIG. 6 is an exemplary graph showing a threshold for opening a mapped block.

Turning to FIG. 6, a threshold 602 is shown that may establish whether data is written to a mapped block or a chaotic block. When the memory system is not near full capacity, the region 604 of the graph in FIG. 6 indicates that data is written to a specific chaotic block or general chaotic block, regardless of the length of data to be written. As the memory system nears full capacity, data may be written to mapped blocks, as indicated by the region 606 in FIG. 6. The threshold 602 indicates the boundary between the chaotic region 604 and the mapped region 606. Generally, as the memory device nears full capacity, data will predominantly be written and/or relocated to mapped blocks, resulting in improved sequential write performance.

Data with an LBA in a particular LBA range may be written to a mapped block corresponding to the particular LBA range. A mapped block is written to with data in the order received, irrespective of the LBA order of the data. Data may be written to a mapped block when an open mapped block already exists when the data to be written arrives at the memory system 102. Alternately, a mapped block may be opened if the quantity of valid data in the memory system 102 exceeds a predetermined threshold, and the data may be written to the newly opened mapped block. The predetermined threshold may be based on the length of the data to be written. In FIG. 4, for example, LBA ranges L2, L3, L8, and L11 are assigned such that data for these LBA ranges is written to mapped blocks M1, M2, M3, and M4, respectively.

The quantity of open mapped blocks may be limited to a predetermined maximum in order to restrict the amount of unprogrammed capacity existing in open mapped blocks. The predetermined maximum may be set such that there is sufficient physical capacity remaining in the memory device to store the entire logical capacity of the memory device. Therefore, the predetermined maximum quantity of open mapped blocks may be based on the requirement that the sum of the amount of valid data, obsolete data, and unprogrammed locations cannot exceed the maximum number of physical locations in the memory device.

If the predetermined maximum of mapped blocks already exists, an existing mapped block is closed before a new mapped block can be opened. The selection of an existing mapped block to close may be based on which mapped block is least recently written. A mapped block may also be closed when it is full, although such a mapped block need not contain data for the entire LBA range for which it is assigned. Once a mapped block is closed, no further data can be written to it.

Data with an LBA in a particular LBA range may also be written to a specific chaotic block that includes the particular LBA range. Data written to a specific chaotic block is written in the order the data is received, regardless of the LBA order of the data. Data may be written to a specific chaotic block when an open specific chaotic block already exists when the data to be written arrives at the memory system 102. A specific chaotic block may be assigned for writing data for a plurality of contiguous LBA ranges. For example, in FIG. 4, LBA ranges L4, L5, and L6 make up a chaotic logical range that is larger than any particular LBA range. The chaotic logical range is assigned such that data for LBA ranges L4, L5, and L6 is written to specific chaotic block C1.

A specific chaotic block may relate to frequently updated information, such as host metadata. Host metadata includes root directory and file allocation data for the FAT file system, and $mft and $bitmap file data in the NTFS file system. Multiple specific chaotic blocks may exist, with each dedicated to a chaotic logical range composed of contiguous LBA ranges.

Data may also be written to a general chaotic block that is assigned for writing data for any LBA range. As with the other types of write blocks, data written to a general chaotic block is written in the order the data is received, regardless of the LBA order of the data. Data with an LBA in a particular LBA range may be written to a general chaotic block if a mapped block or a specific chaotic block does not exist for the particular LBA range and if a new mapped block is not opened. As described above, a new mapped block may be opened if the quantity of valid data in the memory system exceeds a predetermined threshold. In FIG. 4, for example, LBA ranges L1, L7, L9, L10, and L12 are each assigned such that data for those LBA ranges is written to the general chaotic block GC.

Figure 5:
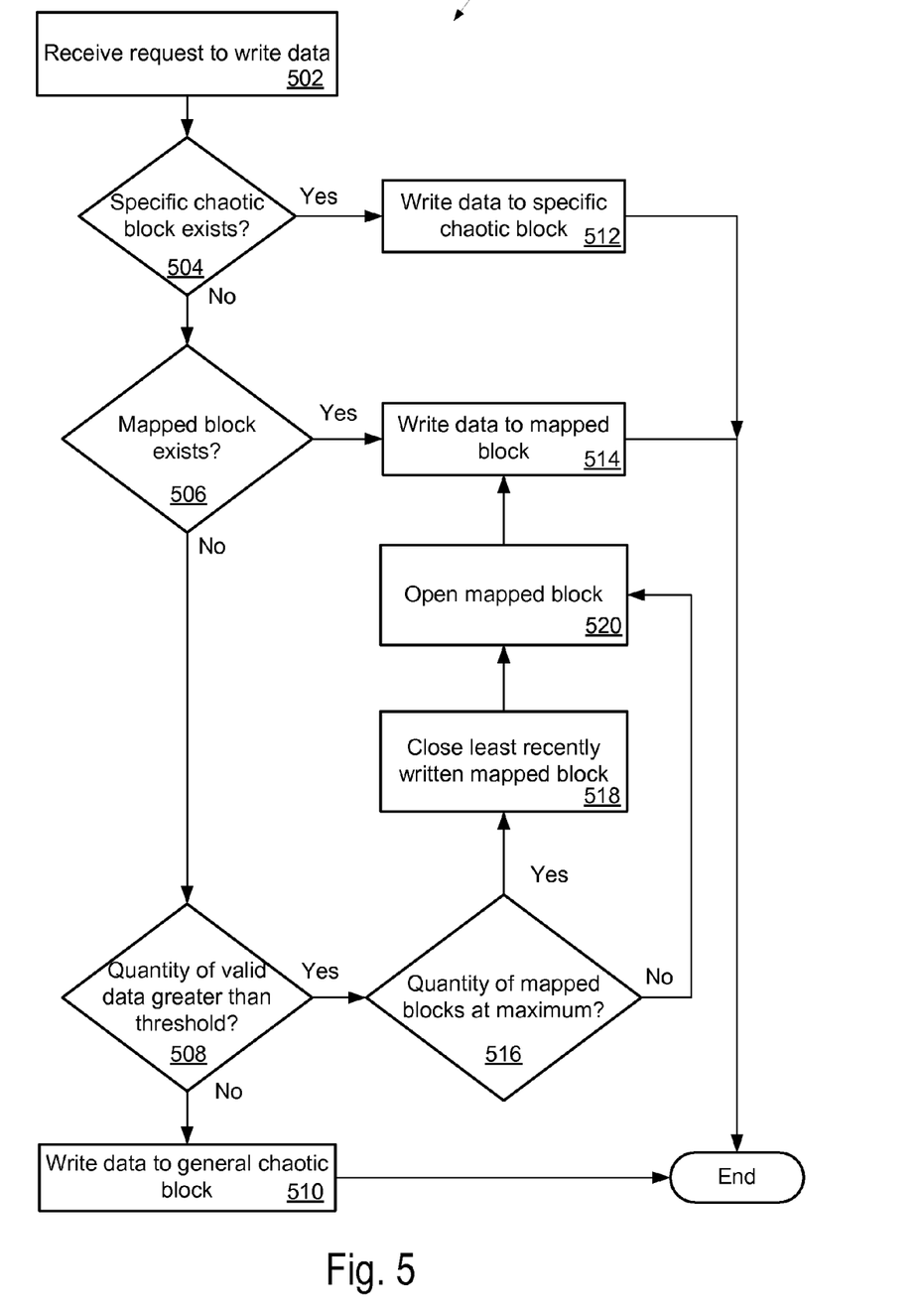
FIG. 5 is a flow diagram illustrating a method of writing data to particular write block types.

FIG. 5 is a flow diagram illustrating a method 500 of writing data to particular write block types. The method 500 writes data to particular write block types depending on the LBA of the data, the existence of open mapped or specific chaotic blocks, and the quantity of valid data in the memory system. The method 500 may be performed as a foreground or background process. Regardless of the particular write block type being written to, data is written to a mapped block, specific chaotic block, or general chaotic block in the order the data is received. The memory controller 114 in the memory system 102 may implement the method 500, for example. Each of the steps described in FIG. 5 for the method 500 may be performed alone or in combination with other steps.

At step 502, a request to write data is received. A host 100 may send the request to the memory system 102 or the request may be received internally in the memory system 102 to write data relocated during a flushing operation. The data to be written has an LBA that may include a starting address and an offset or length. At step 504, if a specific chaotic block exists for writing data for the LBA range associated with the data to be written, then the data is written to that specific chaotic block at step 512. A specific chaotic block may exist for a given LBA for frequently updated information, such as host metadata, for example. The controller 114 may access a data structure 700, such as the one shown in FIG. 7, to determine whether a specific chaotic block exists for the LBA associated with the data to be written at step 504. The controller 114 may perform a binary search of the data structure 700, for example, to find whether an assigned write blocks exists for the LBA range.

If a specific chaotic block does not exist at step 504 for the data to be written, then the method 500 continues to step 506. At step 506, it is determined whether a mapped block exists for the LBA associated with the data. If a mapped block exists at step 506, then the data is written to the mapped block at step 514. Similar to step 504, the controller 114 may access a data structure 700 to determine whether a mapped block exists for the LBA associated with the data. A mapped block may exist for a particular LBA range if it was previously opened in response to determining that the quantity of valid data in the memory system is greater than a predetermined threshold.

If a mapped block does not exist at step 506 for the data to be written, then the method 500 continues to step 508. At step 508, it is determined whether the quantity of valid data in the memory system is greater than a predetermined criteria, such as a predetermined threshold, for example. The predetermined threshold may be based on the length of the data to be written. If the quantity of valid data in the memory system is greater than the predetermined threshold, then a new mapped block may be opened and written to at steps 520 and 514. LBA fragmentation may be minimized when opening and writing data to a mapped block due to writing sequentially addressed data to the mapped blocks as the memory system nears full capacity. In addition, garbage collection operations on previously written chaotic blocks may serve to regroup data according to its associated LBA, and further assist in minimizing LBA fragmentation. Therefore, as the memory system nears full capacity, the data stored in the memory system transitions from chaotically addressed data to data consolidated by LBA range.

As shown in FIG. 6, a threshold 602 may establish whether data is written to a mapped block or a chaotic block. When the memory system is not near full capacity, the region 604 of the graph in FIG. 6 indicates that data is written to a specific chaotic block or general chaotic block, regardless of the length of data to be written. However, as the memory system fills, data may be written to mapped blocks, as indicated by the region 606 in the graph of FIG. 6. Whether data is written to a mapped block depends on the length of the data to be written, as shown by the line 602 indicating the threshold between chaotic region 604 and mapped region 606. Generally, as the memory device nears full capacity, data will predominantly be written and/or relocated to mapped blocks, resulting in improved sequential write performance.

Returning to FIG. 5, if the quantity of valid data in the memory system is not greater than a predetermined threshold at step 508, then the data is written to a general chaotic block at step 510. The general chaotic block is not assigned to any particular LBA range. However, if the quantity of valid data in the memory system is greater than a predetermined threshold at step 508, then the method 500 continues to step 516.

Figure 7:
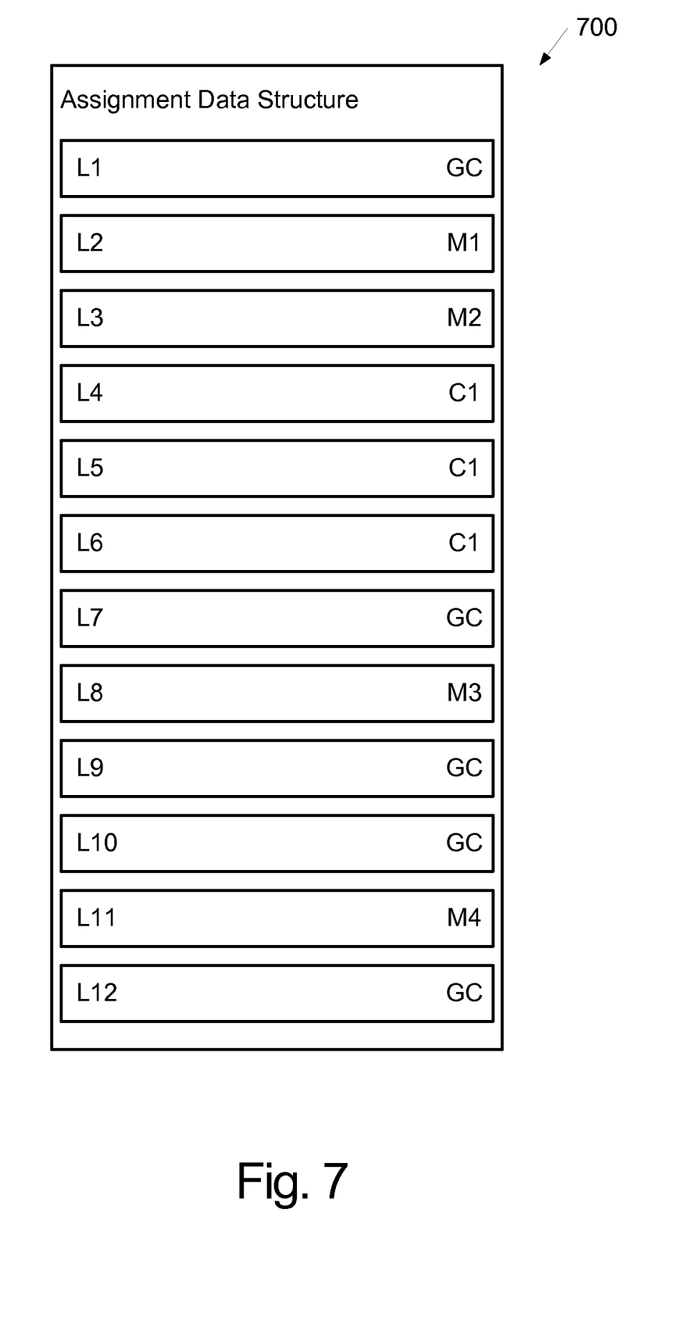
FIG. 7 illustrates an exemplary data structure for assigning write blocks to logical block address ranges.

As described previously, the quantity of open mapped blocks may be limited to a predetermined maximum. Whether the maximum number of mapped blocks has been reached is determined at step 516. If the predetermined maximum of mapped blocks already exists at step 516, an existing mapped block is closed at step 518 before a new mapped block can be opened at step 520. Data is written to the newly opened mapped block at step 514. However, if the predetermined maximum of mapped blocks does not exist at step 516, a new mapped block is opened at step 520 and the data is written to the mapped block at step 514. The controller 114 may assign a newly opened mapped block to the specified LBA range by updating a data structure 700, for example.

If a mapped block is closed at step 518, which mapped block is closed may be based on the least recently written mapped block. A data structure 800, such as in FIG. 8, may contain information on recently written mapped blocks. The controller 114 may access the data structure 800 to determine the least recently written mapped block, for example. To close a mapped block at step 518, all physical locations in the mapped block need to be filled. Depending on whether the amount of valid data in the memory system is greater than a predetermined threshold, data is relocated from blocks with related or unrelated LBA addresses to the mapped block to be closed. If the amount of valid data in the memory system is greater than the predetermined threshold, as described above, then data for the same LBA range is relocated to the mapped block to be closed. In other words, data associated with the LBA range of the mapped block to be closed is consolidated in the mapped block to be closed. However, if the amount of valid data in the memory system is not greater than the predetermined threshold, then data that is being flushed from an unrelated LBA range, e.g., during a garbage collection operation, may be relocated to the mapped block to be closed.

FIG. 7 illustrates an exemplary data structure 700 for assigning write blocks to logical block address ranges. The data structure 700 may be stored in a block in the flash memory with a partial or full copy in the working RAM in the memory device. The data structure 700 records assignments of the write blocks to particular LBA ranges. When a mapped block is opened or closed, the entry for the particular LBA range is updated to reflect the change. In addition, the data structure 700 indicates if a LBA range is assigned to a general chaotic block or a specific chaotic block. The exemplary data structure 700 in FIG. 7 mirrors the LBA range assignments to write blocks as shown in FIG. 4. In particular, LBA ranges L1, L7, L9, L10, and L12 are assigned to a general chaotic block GC. LBA ranges L2, L3, L8, and L11 are assigned to mapped blocks M1, M2, M3, and M4, respectively. LBA ranges L4, L5, and L6 are assigned to a specific chaotic block C1.

Figure 8:
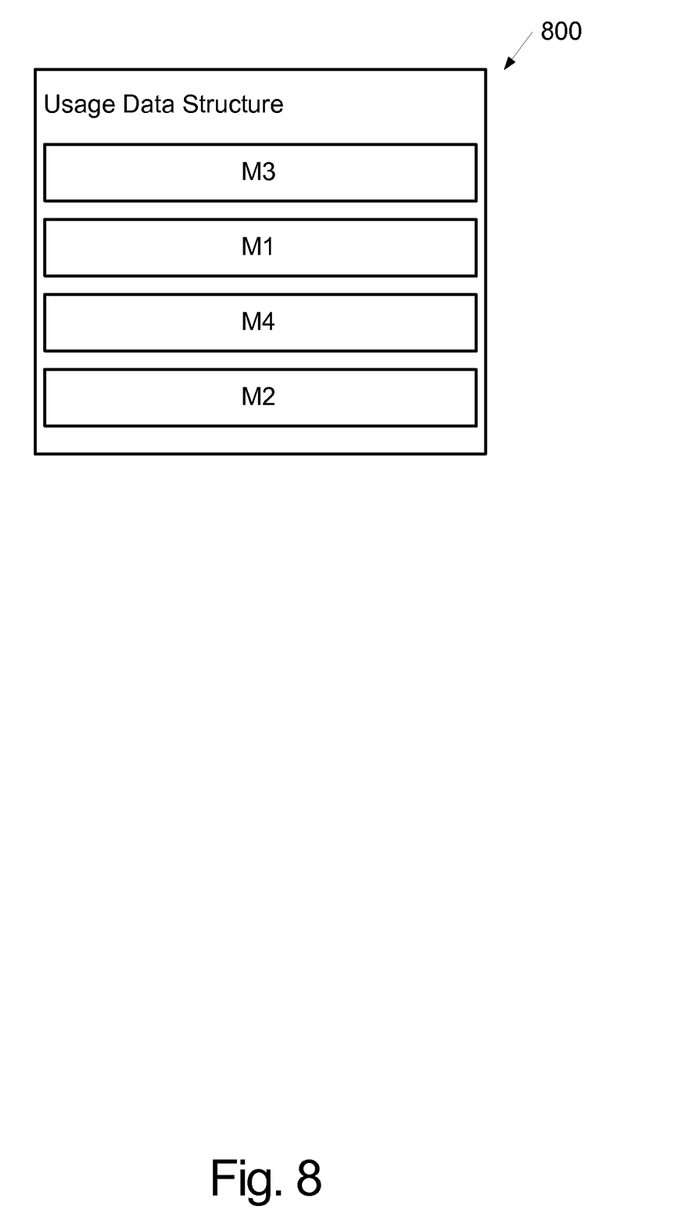
FIG. 8 illustrates an exemplary data structure for tracking usage of write blocks.

FIG. 8 illustrates exemplary data structure 800 for tracking usage of mapped blocks. The data structure 800 may be stored in a block in the flash memory with a partial or full copy in the working RAM in the memory device. The data structure 800 records a chain of mapped blocks in order of usage. When the quantity of mapped blocks reaches a predetermined maximum, a mapped block needs to be closed before a new mapped block can be opened for the data to be written. The memory system may access the data structure 800 to determine and select the least recently written mapped block. The data structure 800 shows exemplary entries of mapped blocks M3, M1, M4, and M2 in order of recent writing. In the data structure 800, for example, mapped block M3 is the most recently written. Therefore, if a mapped block needs to be closed, mapped block M2 would be selected because it is the least recently written block.

In a memory including two bits per cell, also known as a D2 memory, a host may write to the memory one page at a time. A D2 memory system incorporating the concepts in FIGS. 4, 5, and 6 may include a main storage area that stores the write blocks assigned to specified LBA ranges, as described previously. The main storage area may be a multi-level cell flash memory and be compatible with programming sequences for D2 memory. In contrast, memories may include more than two bits per cell, such as three bits per cell (D3 memory) or four bits per cell (D4 memory).

Figure 9:
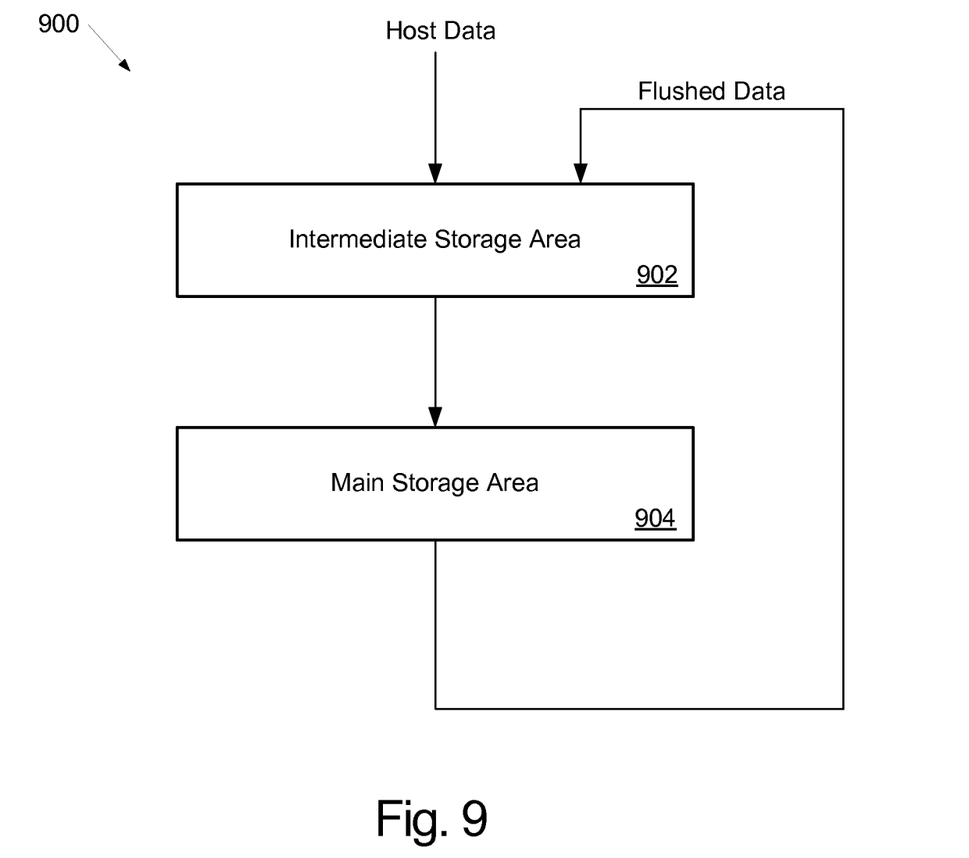
FIG. 9 shows an embodiment of a system of dynamically writing data to particular write block types when using an intermediate storage area and a main storage area.
Figure 10:
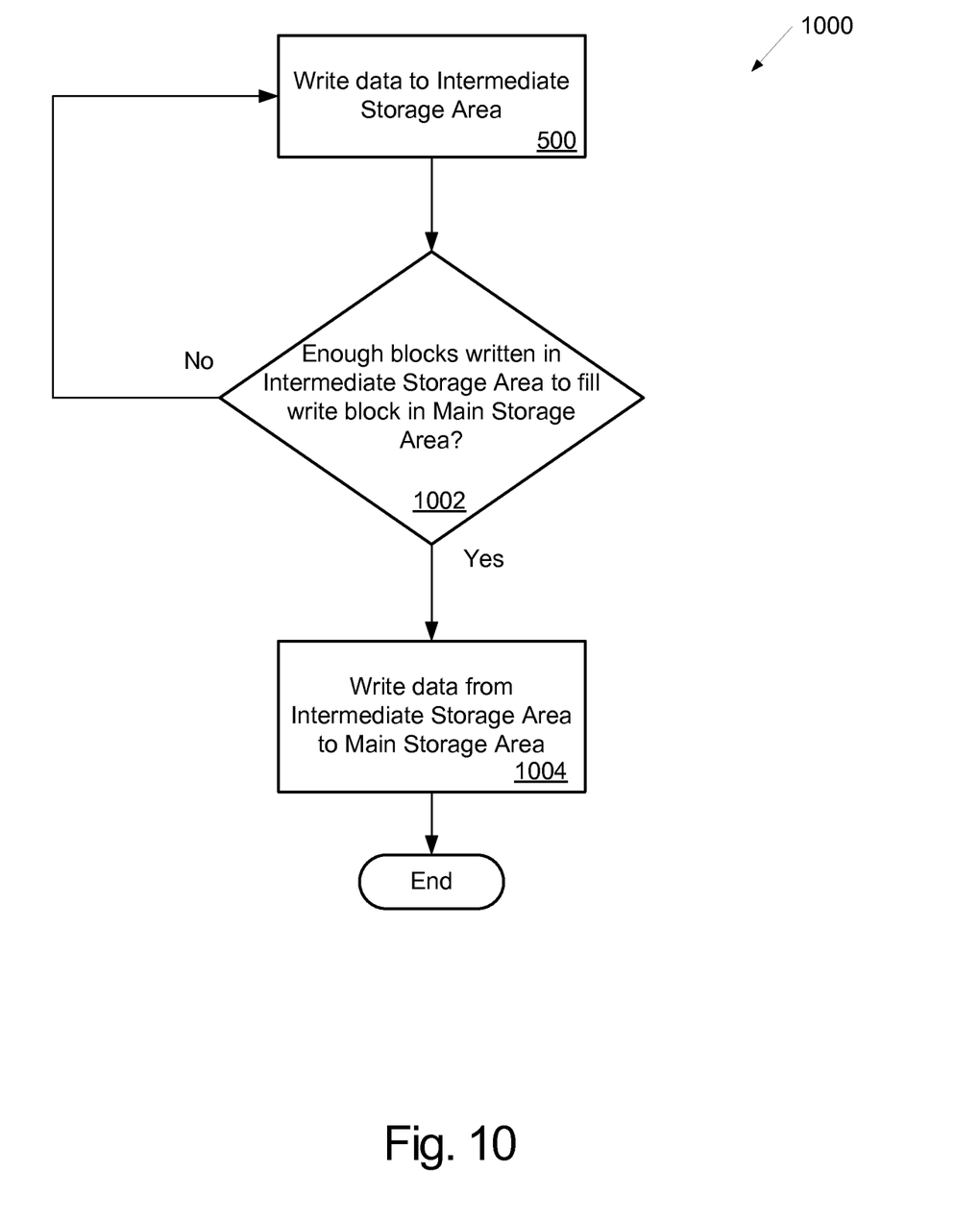
FIG. 10 is a flow diagram illustrating a method of writing data to particular write block types when using an intermediate storage area and a main storage area.

FIG. 9 shows an embodiment of a system 900 of dynamically mapping logical block address ranges to write blocks for memories including an intermediate storage area and a main storage area. FIG. 10 is a flow diagram illustrating a method 1000 of dynamically mapping logical block address ranges to write blocks for memories including an intermediate storage area and a main storage area. In the system 900, both data written from a host and flushed data from garbage collection operations are written to write blocks in the intermediate storage area 902.

D2, D3, and D4 memories may include an intermediate storage area 902 and a main storage area 904. D2 memories may include layered storage areas in order to take advantage of faster writing to binary flash memory in the intermediate storage area 902. Layered storage areas may be utilized in D3 and D4 memories because data is written in larger chunks to the main storage area 904. In particular, D3 and D4 memories are typically programmed more than one page at a time, in multiple write operations, or in an order different from the addressing order.

In memories with layered storage areas, the main storage area 904 ultimately contains a consolidation of the written data, while the intermediate storage area 902 temporarily stores the write blocks assigned to specified LBA ranges as in the method 500, described previously with respect to FIG. 5. The intermediate storage area 902 may be a binary flash memory and the main storage area 904 may be a multi-level cell flash memory. Block sizes in the intermediate storage area 902 may differ from the block sizes in the main storage area 904. For example, the main storage area 904 could have four, eight, or sixteen times the capacity of the intermediate storage area 902.

As write blocks in the intermediate storage area 902 are written, enough filled write blocks in the intermediate storage area 902 may fill a single write block in the main storage area 904. If the requisite number of write blocks in the intermediate storage area 902 is reached at step 1002, the write blocks are consolidated in the main storage area 904 at step 1004. If the requisite number of write blocks is not reached at step 1002, data continues to be written as in the method 500. In some embodiments, data from the intermediate storage area 902 may be consolidated into multiple write blocks in the main storage area 904.

Alternatively, as write blocks in the intermediate storage area 902 are written, enough data spread over multiple blocks in the intermediate storage area 902 may fill a single write block in the main storage area 904. The multiple blocks in the intermediate storage area 902 may be for the same LBA range, for example. If there is enough data in these multiple blocks in the intermediate storage area 902 at step 1002, then this data is consolidated in the main storage area 904 at step 1004. If there is not enough data in the intermediate storage area 902 at step 1002, data continues to be written as in the method 500. In some embodiments, data from the intermediate storage area 902 may be consolidated into multiple write blocks in the main storage area 904.

A method and system has been disclosed for writing data to a memory device including writing data to varying types of physical write blocks. Depending on whether the quantity of valid data in the memory device meets a predetermined criteria, the data is written to a specific chaotic block, a general chaotic block, or a mapped block. The mapped block is assigned for writing data for the LBA range, the specific chaotic block is assigned for writing data for contiguous LBA ranges including the LBA range, and the general chaotic block is assigned for writing data for any LBA range. Lower fragmentation and write amplification ratios may result by using this method and system.

It is intended that the foregoing detailed description be regarded as illustrative rather than limiting, and that it be understood that it is the following claims, including all equivalents, that are intended to define the spirit and scope of this invention.

I claim:

1. A memory device, comprising:
   a plurality of memory blocks; and
   a controller configured to:
      receive a request to write data to the memory device, where the data has a logical block address (LBA) within a first LBA range;
      determine based on both a quantity of valid data in the memory device and a length of the data associated with the request whether predetermined criteria has been met;
      if the predetermined criteria has been met, write the data to a chaotic block, wherein the chaotic block comprises a block available for a plurality of discontiguous LBA ranges; and
      if the predetermined criteria has not been met, write the data to a mapped block, the mapped block assigned for writing data for a single contiguous LBA range including the first LBA range.

2. The memory device of claim 1, where:
   the predetermined criteria comprises a predetermined threshold; and
   wherein the predetermined threshold varies based on the amount of valid data in the memory device such that, as the amount of valid data in the memory increases the length of data needed to meet the predetermined threshold decreases.

3. The memory device of claim 1, where the data comprises data to be written from a host or data to be written for a garbage collection operation.

4. The memory device of claim 1, where writing the data to the mapped block comprises the controller further configured to:
   if a quantity of mapped blocks is at a predetermined maximum:
      close a least recently written mapped block, comprising the controller configured to relocate data for a second LBA range to the least recently written mapped block until the least recently written mapped block is full;
      open the mapped block; and
      write the data to the mapped block.

5. A memory device, comprising:
   a plurality of memory blocks; and
   a controller configured to:
      receive a request to write data to the memory device, where the data has a logical block address (LBA) within a first LBA range;
      determine whether a quantity of valid data in the memory device meets a predetermined criteria;
      if the quantity of valid data does not meet the predetermined criteria, write the data to a chaotic block, wherein the chaotic block comprises a specific chaotic block assigned for writing data for a chaotic LBA range including the first LBA range, where the chaotic LBA range comprises a plurality of contiguous LBA ranges:
         write the data to the chaotic block comprises the controller further configured to write the data to the specific chaotic block if the specific chaotic block exists in the memory blocks; and
      if the quantity of valid data meets the predetermined criteria, write the data to a mapped block, the mapped block assigned for writing data for the first LBA range.

6. The memory device of claim 5, where:
   the chaotic block further comprises a general chaotic block assigned for writing data for any LBA range; and
   writing the data to the chaotic block further comprises the controller further configured to write the data to the general chaotic block if the specific chaotic block does not exist in the memory blocks.

7. The memory device of claim 5, where writing the data to the mapped block comprises the controller further configured to:
   if a quantity of mapped blocks does not meet a predetermined maximum and if the specific chaotic block does not exist:
      open the mapped block; and
      write the data to the mapped block.

8. The memory device of claim 5, where the controller is further configured to write the data to the mapped block if the mapped block exists in the memory blocks and if the specific chaotic block does not exist in the memory blocks.

9. The memory device of claim 5, where the data comprises host metadata and the specific chaotic block is assigned for writing the host metadata.

10. A memory device, comprising:
    a plurality of memory blocks; and
    a controller configured to:
       receive a request to write data to the memory device, where the data has a loqical block address (LBA) within a first LBA range;
       determine whether a quantity of valid data in the memory device meets a predetermined criteria;
       if the quantity of valid data does not meet the predetermined criteria, write the data to a chaotic block; and
       if the quantity of valid data meets the predetermined criteria, write the data to a mapped block, the mapped block assigned for writing data for the first LBA range, wherein writing the data to the mapped block comprises the controller further configured to:
          if a quantity of mapped blocks is at a predetermined maximum:
             close a least recently written mapped block, comprising the controller configured to relocate data for the first LBA range to the least recently written mapped block until the least recently written mapped block is full;
             open the mapped block; and
             write the data to the mapped block.

11. The memory device of claim 10, where relocating comprises the controller further configured to relocate data for the first LBA range from a general chaotic block to the least recently written mapped block, the general chaotic block assigned for writing data for any LBA range.

12. A method of writing data to a memory device having a plurality of memory blocks, comprising:
    in a controller of the memory device:

receiving a request to write data to the memory device, where the data has a logical block address (LBA) within a first LBA range;

determining based on both a quantity of valid data in the memory device and a length of the data associated with the request whether a predetermined criteria has been met; and writing the data into one of a chaotic block or a mapped block in response to the determination such that:

if the predetermined criteria has not been met, writing the data to the chaotic block, wherein the chaotic block comprises a block available for a plurality of discontiguous LBA ranges; and if the predetermined criteria has been met, writing the data to the mapped block, the mapped block assigned for writing data for a single contiguous LBA range including the first LBA range.

13. The method of claim 12, where:

the predetermined criteria comprises a predetermined threshold; and wherein the predetermined threshold varies based on the amount of valid data in the memory device such that, as the amount of valid data in the memory increases the length of data needed to meet the predetermined threshold decreases.

14. The method of claim 12, where the data comprises data to be written from a host or data to be written for a garbage collection operation.

15. The method of claim 12, where writing the data to the mapped block comprises:

if a quantity of mapped blocks is at a predetermined maximum:

closing a least recently written mapped block, comprising relocating data for a second LBA range to the least recently written mapped block until the least recently written mapped block is full;

opening the mapped block; and writing the data to the mapped block.

16. A method of writing data to a memory device having a plurality of memory blocks, comprising:

receiving a request to write data to the memory device, where the data has a logical block address (LBA) within a first LBA range;

determining whether a quantity of valid data in the memory device meets a predetermined criteria;

if the quantity of valid data does not meet the predetermined criteria, writing the data to a chaotic block, wherein:

the chaotic block comprises a specific chaotic block assigned for writing data for a chaotic LBA range including the first LBA range, where the chaotic LBA range comprises a plurality of contiguous LBA ranges; and writing the data to the chaotic block comprises writing the data to the specific chaotic block if the specific chaotic block exists in the memory blocks; and if the quantity of valid data meets the predetermined criteria, writing the data to a mapped block, the mapped block assigned for writing data for the first LBA range.

17. The method of claim 16, where:

the chaotic block further comprises a general chaotic block assigned for writing data for any LBA range; and writing the data to the chaotic block further comprises writing the data to the general chaotic block if the specific chaotic block does not exist in the memory blocks.

18. The method of claim 16, where writing the data to the mapped block comprises:

if a quantity of mapped blocks does not meet a predetermined maximum and if the specific chaotic block does not exist:

opening the mapped block; and writing the data to the mapped block.

19. The method of claim 16, further comprising writing the data to the mapped block if the mapped block exists in the memory blocks and if the specific chaotic block does not exist in the memory blocks.

20. The method of claim 16, where the data comprises host metadata and the specific chaotic block is assigned for writing the host metadata.

21. A method of writing data to a memory device having a plurality of memory blocks, comprising:

receiving a request to write data to the memory device, where the data has a logical block address (LBA) within a first LBA range;

determining whether a quantity of valid data in the memory device meets a predetermined criteria;

if the quantity of valid data does not meet the predetermined criteria, writing the data to a chaotic block;

if the quantity of valid data meets the predetermined criteria, writing the data to a mapped block, the mapped block assigned for writing data for the first LBA range; and if a quantity of mapped blocks is at a predetermined maximum:

closing a least recently written mapped block, comprising relocating data for the first LBA range to the least recently written mapped block until the least recently written mapped block is full;

opening the mapped block; and writing the data to the mapped block.

22. The method of claim 21, where relocating comprises relocating data for the first LBA range from a general chaotic block to the least recently written mapped block, the general chaotic block assigned for writing data for any LBA range.

* * * * *

UNITED STATES PATENT AND TRADEMARK OFFICE
CERTIFICATE OF CORRECTION

PATENT NO.         : 8,452,940 B2
APPLICATION NO.    : 12/346451
DATED              : May 28, 2013
INVENTOR(S)        : Alan W. Sinclair Page 1 of 1

It is certified that error appears in the above-identified patent and that said Letters Patent is hereby corrected as shown below:

In the Claims

In column 12, claim 10, about line 40, after "where the data has a" replace "loqical" with --logical--.

Signed and Sealed this
Twentieth Day of August, 2013

Teresa Stanek Rea
*Acting Director of the United States Patent and Trademark Office*